United States Patent
Pierce et al.

(10) Patent No.: US 12,436,760 B2
(45) Date of Patent: Oct. 7, 2025

(54) INTERACTIVE CODE VISUALIZATION SYSTEM

(71) Applicant: The Travelers Indemnity Company, Hartford, CT (US)

(72) Inventors: JunYi Q. Pierce, Glastonbury, CT (US); David E. Moyer, Glastonbury, CT (US); Lisa H. Chen, Orange, CT (US); Wayne E. Osborn, Ivoryton, CT (US); Michael F. Presch, Hebron, CT (US); Albert A. Hansrisuk, Glastonbury, CT (US)

(73) Assignee: THE TRAVELERS INDEMNITY COMPANY, Hartford, CT (US)

(*) Notice: Subject to any disclaimer, the term of this patent is extended or adjusted under 35 U.S.C. 154(b) by 411 days.

(21) Appl. No.: 17/837,470

(22) Filed: Jun. 10, 2022

(65) Prior Publication Data

US 2023/0401056 A1    Dec. 14, 2023

(51) Int. Cl.
   *G06F 8/71*     (2018.01)
   *G06F 8/34*     (2018.01)
   *G06F 8/41*     (2018.01)

(52) U.S. Cl.
   CPC ............... *G06F 8/71* (2013.01); *G06F 8/34* (2013.01); *G06F 8/427* (2013.01)

(58) Field of Classification Search
   None
   See application file for complete search history.

(56) References Cited

U.S. PATENT DOCUMENTS

| | | | | |
|---|---|---|---|---|
| 2009/0125546 A1* | 5/2009 | Iborra | ............... | G06F 8/30 |
| | | | | 707/999.102 |
| 2010/0161676 A1* | 6/2010 | Kazmaier | ............ | G06F 9/4488 |
| | | | | 707/E17.055 |
| 2013/0080349 A1* | 3/2013 | Bhola | ................. | G06Q 10/067 |
| | | | | 705/348 |
| 2018/0024814 A1* | 1/2018 | Ouali | ....................... | G06F 8/10 |
| | | | | 717/105 |
| 2020/0133651 A1* | 4/2020 | Holzer | .................... | G06F 8/65 |
| 2021/0216307 A1* | 7/2021 | Subramanian | ........... | G06F 8/36 |
| 2022/0100477 A1* | 3/2022 | Mosko | .................. | G06F 8/658 |
| 2022/0334807 A1* | 10/2022 | Rai | ......................... | G05B 19/05 |

* cited by examiner

*Primary Examiner* — Ryan D. Coyer
(74) *Attorney, Agent, or Firm* — CANTOR COLBURN LLP

(57) ABSTRACT

A system includes a user interface to interpret object models and display the object models in a graphical format, a database service to access a database that identifies code associated with one or more projects, a translator service configured to parse the code and generate object models associated with a selected project, and an analysis tool. The analysis tool is executable by at least one processing device and results in: identifying one or more relationships between the object models of the selected project, outputting one or more visual interfaces on the user interface to document the one or more relationships in a graphical format, displaying properties of a selected object model on the user interface, detecting a change including an update received through the user interface to the properties, translating the change into an update of the selected object model, and storing the update of the selected object model.

25 Claims, 13 Drawing Sheets

INTERACTIVE CODE VISUALIZATION SYSTEM

BACKGROUND

In the process of developing executable code, multiple systems and developers can be involved. For example, system architects can envision a plan as to how various components of a complex application should be partitioned and determine services that will be needed to meet higher-level requirements. However, in some instances, the plan as envisioned may not be fully captured in documentation. Software engineers can develop lower-level software components to implement portions of the design. The system architects may not be aware of the lower-level details to implement the software components, and the software engineers may not understand how all of the components work together to implement an integrated application. For instance, groups of developers may be partitioned to separate user interface development from program logic development, such that the individual developers may not fully understand the details created by other development groups. If a problem or change arises in the software code or data used by the code, the impact may not be well understood where dependencies exist between multiple components. For instance, data producers may not be aware of data consumers and dependencies between data consumers and other software components. Accordingly, it can be challenging to understand the impact of a problem or change, particularly where multiple applications share or reuse software components and/or data between multiple applications.

While newly developed software projects can use tools and techniques to attempt to better track and document design details, many software applications may have already been deployed for use in service. Further, software applications can be developed using many different programming languages. This makes understanding of existing software applications challenging where standardized documentation is unavailable. The absence of documentation for previously deployed applications can make debugging difficult and may lead to less efficient code as updates are made to add or adjust features.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Figure 1:
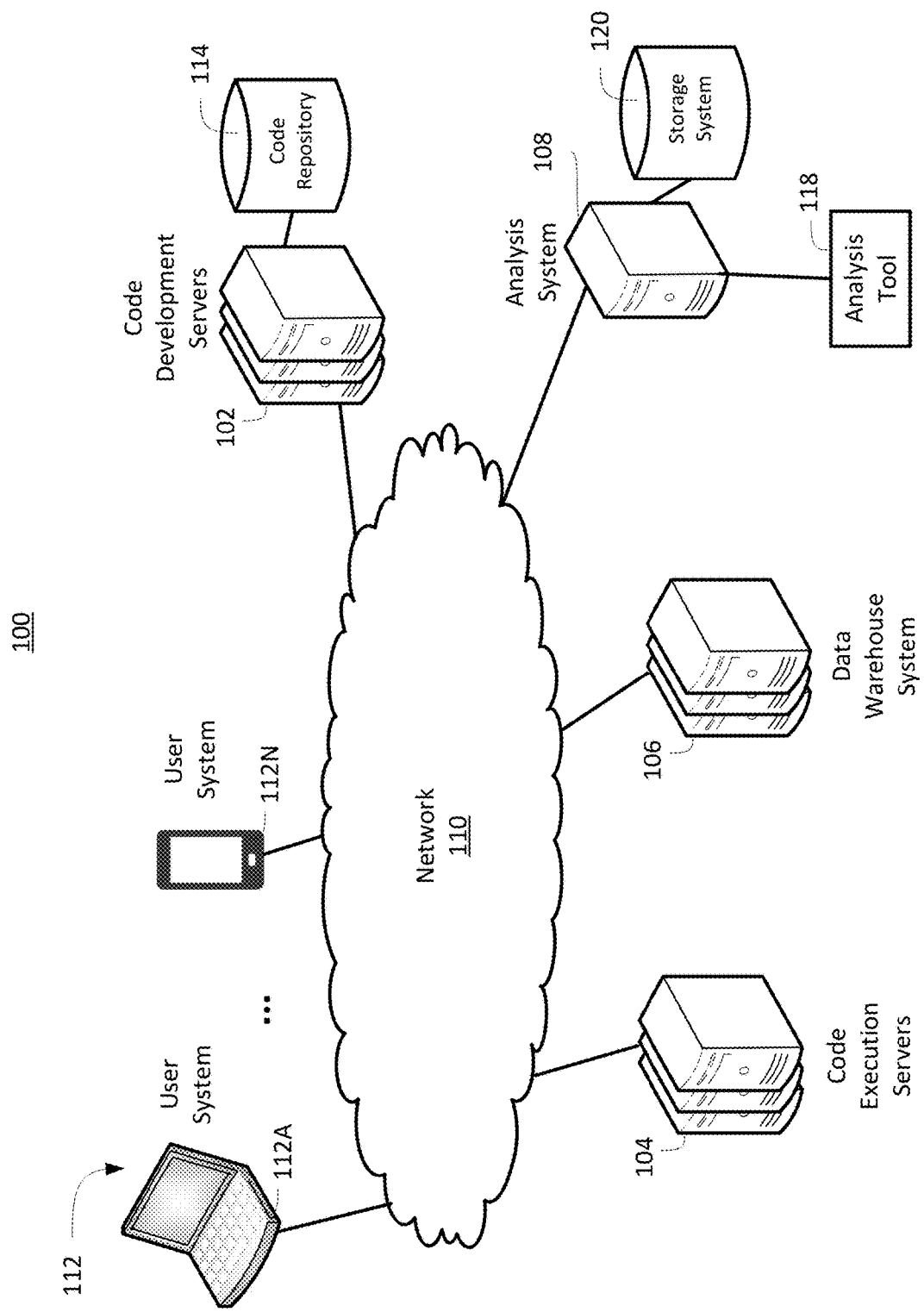
FIG. 1 depicts a block diagram of a system according to some embodiments of the present invention.

According to an embodiment, a system for interactive code visualization is provided. The system can improve computer system performance by generating documentation and diagrams that assist in problem identification, debugging, change management, and development efficiency. The system may also identify the inclusion in projects of code that is not used or is redundantly included, which can assist with removing unnecessary code for better utilization of computer system memory and more efficient execution. Embodiments can analyze the content of code developed in a variety of programming languages, generate object models based on the code, and generate diagrams for on-screen visualization based on the object models through a user interface. The user interface can support editing of the diagrams and underlying code as a proposed change or actual change to be made to software components of a project. For example, where bidirectional translation services are available and a user has change permissions, changes made to on-screen visualizations can be used to update an object model of the project, and an object model to code translator can update or generate a new version of the underlying code based on the update to the object model. Where bidirectional translation is not supported or a user does not have code change permissions, changes made to the on-screen visualization can be captured in an object model and shared with a development team for implementation by the development team.

Embodiments can develop a catalog of designs by analyzing multiple existing projects to construct a database of searchable design patterns. The documented designs can assist in developing new projects by enabling identification of similar components which can be selected for reuse or to serve as a starting point for further modifications. The object models allow for viewing of designs for code developed in a variety of underlying programming languages. Further, where object model to code translation tools are available, language translation can be performed to support integrating a component design originally created in one programming language to be converted into a different programming language. Thus, previously designed applications can be converted in whole or in part to a different programming language to support integration with components created in another programming language.

Where problem system support is provided, the system can be integrated with a problem reporting tool. A searching feature can be used to search for services or projects that may have a link to a problem identified through a problem report by the problem reporting tool. For example, if an error code is identified in a problem report, code or data associated with the error code can be identified. Searching across object models for code that is capable of producing the same error code and/or uses related code or data can assist in identifying code that may need to be updated to address the issue identified in the problem report even though the problem was not yet identified in the related code or data. This proactive debugging can prevent related issues from impacting other users and/or systems and prevent/reduce the propagation of problems that may otherwise occur if the issue was not proactively identified and addressed. Thus, the system provides multiple improvements to computer technology and practical applications which can improve existing system performance along with the future performance of software under development.

Turning now to FIG. 1, a system 100 is depicted upon which interactive code visualization may be implemented. The system 100 includes a plurality of server systems, such as one or more code development servers 102, one or more code execution servers 104, a data warehouse system 106, and an analysis system 108 coupled to a network 110. A plurality of user systems 112 can access content and/or interfaces through the network 110. For example, user system 112A may be configured as a developer system operable to interface with the code development servers 102, while user system 112N may be configured as an architect system operable to interface directly with the analysis system 108 and access other elements of the system 100 indirectly, such as the code development servers 102, code execution servers 104, and data warehouse system 106.

In the example of FIG. 1, the code development servers 102 are operable to develop code files for subsequent execution on the code execution servers 104. Various records associated with code development, execution, and/or problems can be collected and stored in the data warehouse system 106. The data warehouse system 106 can also include data sources that are produced and consumed during execution of code on the code execution servers 104. For example, the data warehouse system 106 can manage access to files and databases and may be further partitioned to control access to the files and data based on user permissions. During the software development process, code can be developed on the code development servers 102 and stored in code repository 114. The code repository 114 can include check-in/checkout version management control of code files.

The analysis system 108 can use data gathered from the code development servers 102, code execution servers 104, and/or data warehouse system 106 to generate object models of code, for instance, by analysis tool 118. The object models can be stored on storage system 120 or elsewhere within the system 100, such as stored by the data warehouse system 106. In some embodiments, working versions of object models are stored in the storage system 120 for manipulation by the analysis tool 118, and upon completion the object models can be committed for long-term storage by the data warehouse system 106. The analysis tool 118 can include or interact with various interfaces to support diagram generation, display, and editing though a user interface that displays object models in a graphical format on the user systems 112. The process of generating object models is further described herein.

In the example of FIG. 1, each of the code development servers 102, code execution servers 104, data warehouse system 106, analysis system 108, and user systems 112 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the code development servers 102, code execution servers 104, data warehouse system 106, analysis system 108, and/or user systems 112. Although depicted separately, one or more of the code development servers 102, code execution servers 104, data warehouse system 106, analysis system 108, and/or user systems 112 can be combined or further subdivided.

The user systems 112 may each be implemented using a computer executing one or more computer programs for carrying out processes described herein. In one embodiment, the user systems 112 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 112 are operated by users having the role of a system architect, a software developer, or a non-developer (e.g., a manager or administrator) with respect to an application development and troubleshooting process, and the role designations may change.

Each of the code development servers 102, code execution servers 104, data warehouse system 106, analysis system 108, and user systems 112 can include a local data storage device, such as a memory device. A memory device, also referred to herein as "computer-readable memory" (e.g., non-transitory memory devices, as opposed to transmission devices or media), may generally store program instructions, code, and/or modules that, when executed by a processing device, cause a particular machine to function in accordance with one or more embodiments described herein.

The network 110 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 110 may be implemented using a wired network, an optical network, a wireless network and/or any kind of physical network implementation known in the art. The network 110 can be further subdivided into multiple sub-networks that may provide different levels of accessibility or prevent access to some elements of the system 100. For example, some users of user systems 112 may have limited (e.g., read-only) access to the data warehouse system 106, code repository 114, and/or the storage system 120.

Figure 2:
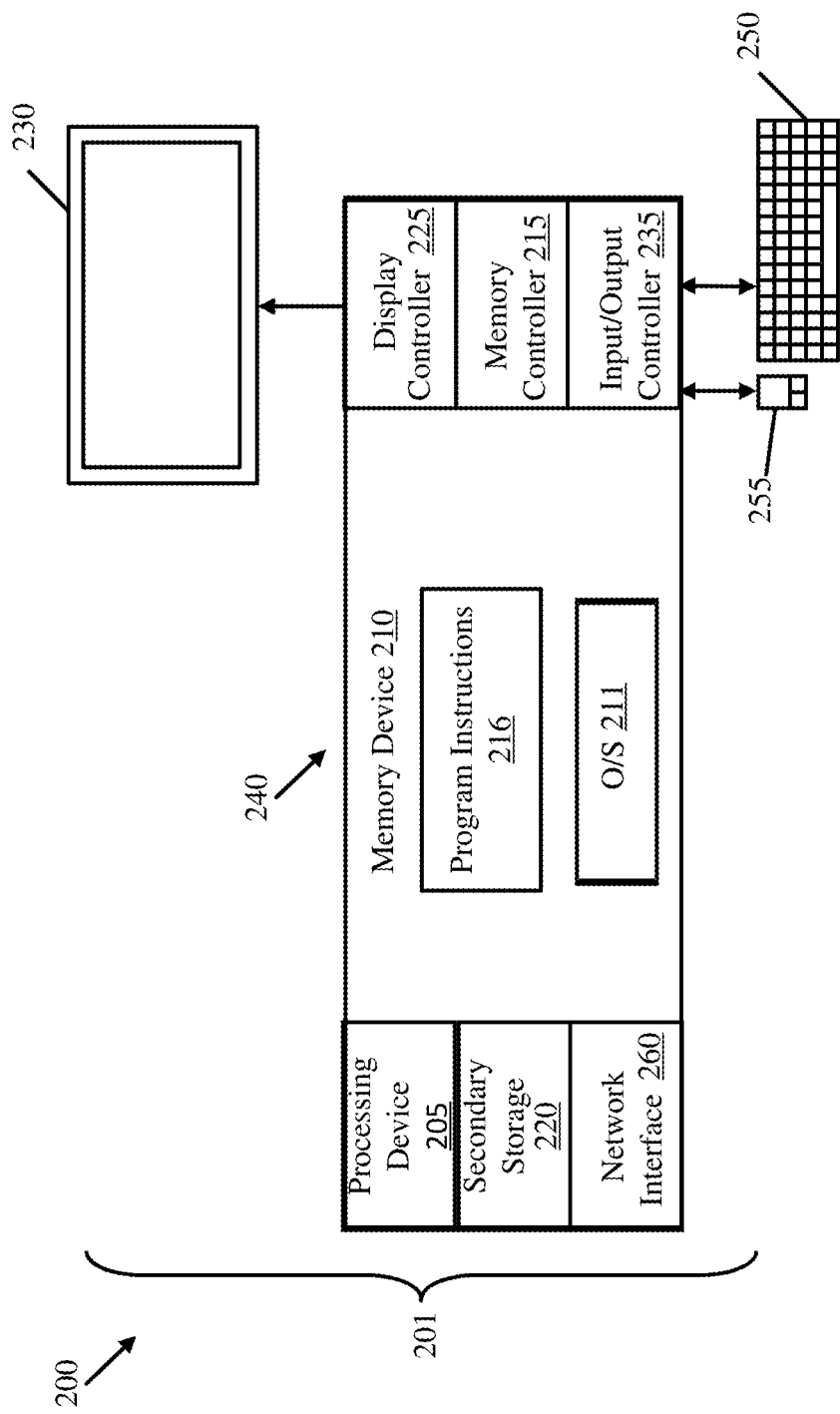
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the code development servers 102, code execution servers 104, data warehouse system 106, analysis system 108, and/or user systems 112 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), or the like, etc.). Secondary storage 220 can include any one or combination of tape, compact disk read only memory (CD-ROM), flash drive, disk, hard disk drive, diskette, cartridge, cassette or the like, etc. Moreover, the memory device 210 and/or secondary storage 220 may incorporate electronic, magnetic, optical, and/or other types of storage media. Accordingly, the memory device 210 and/or secondary storage 220 are examples of a tangible computer readable storage medium 240 upon which instructions executable by the processing device 205 may be embodied as a computer program product. The memory device 210 and/or secondary storage 220 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the processes as further described herein.

The computer 201 of FIG. 2 also includes a network interface 260 that can establish communication channels with one or more other computer systems via one or more network links of the network 110 of FIG. 1. The network interface 260 can support wired and/or wireless communication protocols known in the art.

Figure 3:
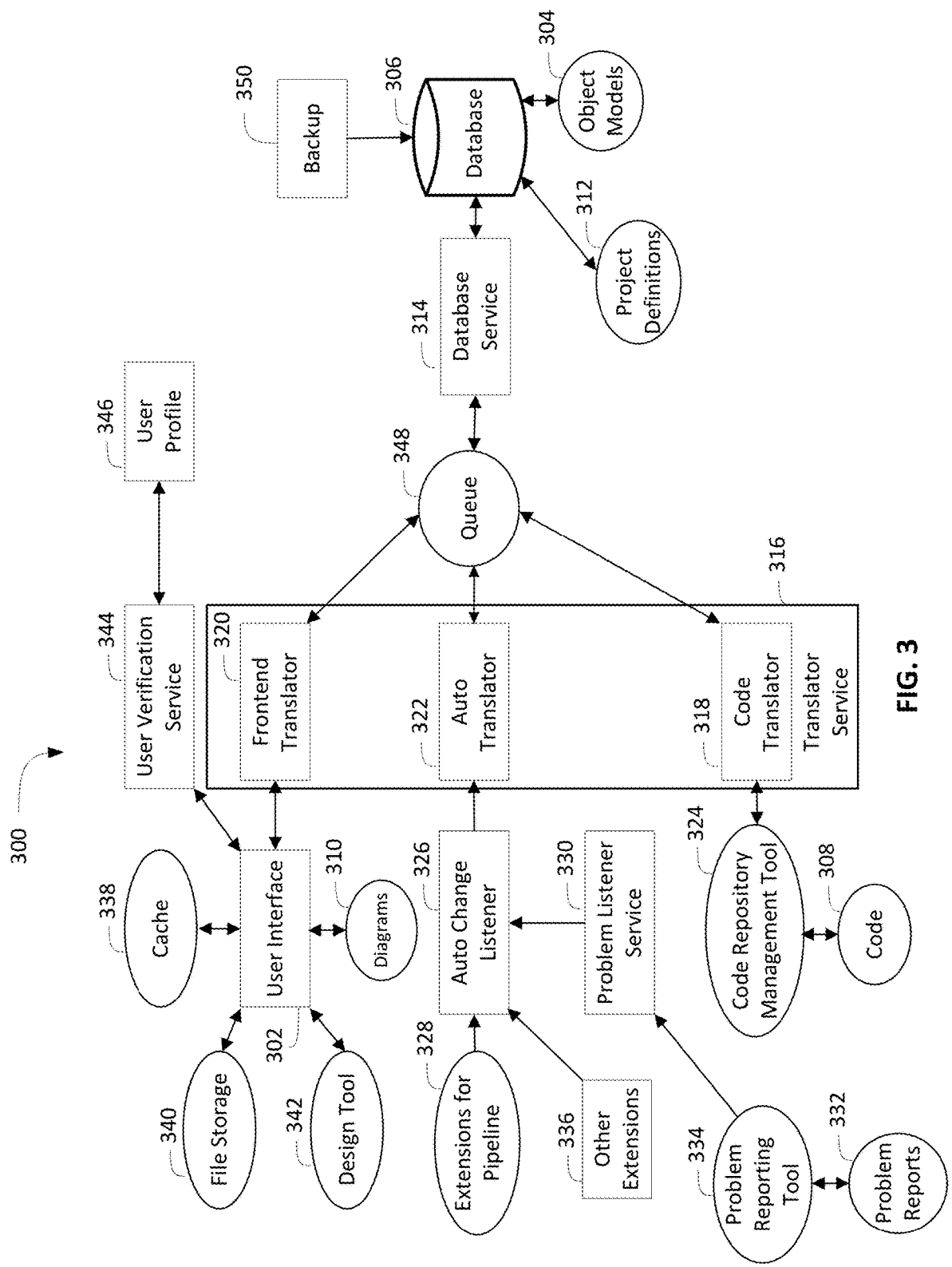
FIG. 3 depicts a block diagram of interactions between system components according to some embodiments of the present invention.

FIG. 3 depicts an example of a block diagram 300 of interactions between system components according to an embodiment and is described in reference to FIGS. 1-3. In embodiments, a user interface 302 is configured to interpret a plurality of object models 304 and display the object models 304 in a graphical format on one or more of the user systems 112. A database 306 can store the object models 304 or links to the object models 304 along with associations linking portions of code 308 with diagrams 310 that are graphical depictions of portions of the code 308. The database 306 can include or link to project definitions 312 that define how portions of the code 308 interact and connect to form a project or executable application. As one example, the database 306 can be a document-oriented database that supports non-relational and non-structured query language (NoSQL) formats, such as a dynamic database supporting flexible data models. A database service 314 is configured to access the database 306 that identifies code 308 associated with one or more projects defined in the project definitions 312.

A translator service 316 is configured to parse the code 308 and generate the object models 304 associated with a selected project of the one or more projects. The translator service 316 can include multiple translators that may perform code 308 to object model 304 translation (e.g., code translator 318), object model 304 to diagram 310 translation (e.g., frontend translator 320), and event to object model 304 translation (e.g., auto translator 322). The code translator 318 can be configured to operate in a single direction to convert the code 308 to one or more object models 304. Where code modification or generation support is available, the code translator 318 can be configured to convert an object model 304 into code 308 or to update the code 308 based on the object model 304. For instance, if updating of the code 308 by the code translator 318 is supported, a change to a value, such as a parameter, made to one of the diagrams 310 through the user interface 302 can result in a change to the object model 304 through the frontend translator 320, and the corresponding change can be made to the code 308 through the code translator. The code translator 318 can be configured to access the code 308 through a code repository management tool 324. The code repository management tool 324 can perform version control and track updates made to the code 308.

The auto translator 322 can receive event notifications from an auto change listener 326 which can trigger update actions. The auto change listener 326 can monitor various sources for changes, problems, or events. For instance, extensions for pipeline support 328 can monitor for deployment of software or changes in build content that may differ from the configuration previously captured in project definitions 312. When a change is detected, the auto translator 322 may trigger the creation of a new version of a corresponding object model 304 or may store a record of the event in the database 306 such that the next time an object model 304 is accessed that has a record of a change or known problem, the user can be warned and given an option to accept the change or take another action. The auto change listener 326 can also interface with a problem listener service 330 that receives notifications of problem reports 332 from a problem reporting tool 334. For instance, when a user observes and reports a problem with deployed software, the problem can be captured in a problem report 332 through problem reporting tool 334. When the problem listener service 330 periodically checks with the problem reporting tool 334 for new or updated problem reports 332, if the problem is related to code 308 or data used by the code 308, a problem notification event can be sent through the auto translator 322 to search for object models 304 that model the code 308 or use the data associated with the problem report 332. The event can be tracked in the database 306 and may be used to flag the problem for the user such that a warning is issued through the user interface 302 upon accessing an object model 304 having an unresolved problem. The user interface 302 may also provide support to identify other object models 304 and associated code 308 that may be indirectly impacted by the problem.

Translations performed by the frontend translator 320 can be bidirectional such that changes to an object model 304 are reflected when a corresponding diagram 310 is displayed through the user interface 302. Similarly, changes to a diagram 310 made through the user interface 302 can be captured in a corresponding object model 304. The user interface 302 can store temporary copies of object models 304 and other associated data in a cache 338 as local copies for faster editing. The user interface 302 can also access file storage 340 for various support files. The user interface 302 can interface with one or more design tools 342, such as an editor or other integrated development environment support tools. For instance, a user may be given an option to view the contents or edit code 308 through a design tool 342 in response to a selection of a component in a diagram 310 that represents an underlying instance of code 308. A user verification service 344 can be used to check a user profile 346 before allowing a current user of the user interface 302 to view and/or edit diagrams 310, code 308, and/or object models 304.

A queue 348 can be used to sequence requests through the database service 314 to access or update the database 306. The queue 348 can manage potential contention issues where asynchronous requests for translation are made through the translators 318, 320, 322. A backup service 350 may periodically access the database 306 to read the contents and make a backup copy in case of a system fault or error resulting in corruption. Although depicted as a single queue, the queue 348 can include multiple queues. For example, the queue 348 can include a separate read queue and write queue to manage bidirectional flows between the translator service 316 and database service 314. As a further example, the queue 348 can be a priority queue that services entries from various sources with different levels of priority. For instance, queue entries from the frontend translator 320 or auto translator 322 may have a higher priority for faster servicing than the code translator 318 to more rapidly respond to user interactions and problem reporting, where code translation can be slowed during higher volume interactions.

Although the example of FIG. 3 depicts a specific configuration and directional flows, it will be understood that components of block diagram 300 may be combined, modified, or further subdivided. For example, the translators 318, 320, 322 can be combined or further subdivided, such as separate code translators for different programming languages.

Figure 4:
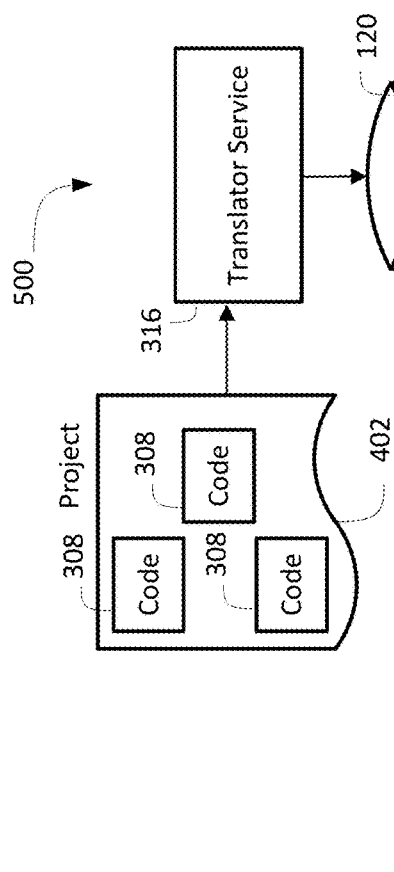
FIG. 4 depicts a block diagram of a translator service interaction with code according to some embodiments of the present invention.

FIG. 4 depicts a block diagram 400 of a translator service interaction with code according to some embodiments. The translator service 316 of FIG. 3 can be used to access a project 402 and parse code 308, which may be distributed over multiple files. The parsing can use techniques similar to a compiler to identify programming language constructs, such as classes, methods, variables, types, data structures, properties, and other such attributes. For instance, based on detecting a file type (e.g., based on a filename extension), the translator service 316 can invoke a code translator 318 (FIG. 3) that is compatible with the file type (e.g., Python, C++, C#, Java, etc.). As depicted in the example block diagram 500 of FIG. 5, the result of the translator service 316 can be generation of one or more object models 304. Object models 304 can be defined to align with the flow of one or more services contained in the project 402. Object models 304 can be stored in the storage system 120 and/or elsewhere within the system 100 of FIG. 1. The object models 304 can be defined in an object file notation in a text format that is programming language agnostic. As such, code 308 written in different programming languages can be modeled in a common format. A project definition can be captured in one of the object models 304 as a project model that aggregates or otherwise combines multiple object models 304 defined at a service/class/method level.

Figure 5:
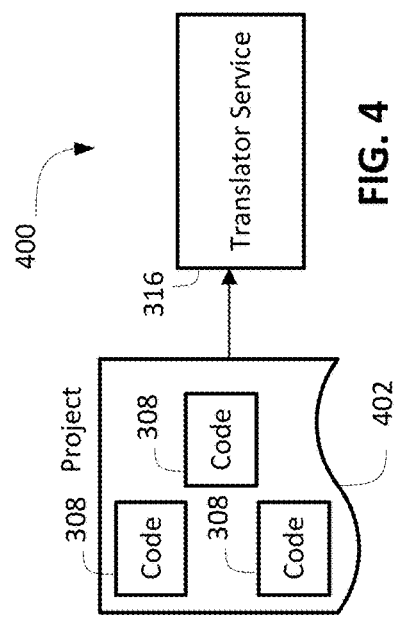
FIG. 5 depicts a block diagram of object model generation according to some embodiments of the present invention.
Figure 6:
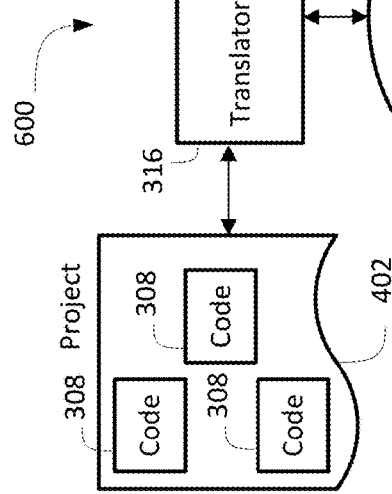
FIG. 6 depicts a block diagram of interactions between a translator service, code, and diagrams according to some embodiments of the present invention.

FIG. 6 depicts a block diagram 600 of interactions between translator service 316, code 308, and diagrams 310 according to some embodiments. The translator service 316 can be used to create the diagrams 310 based on the object models 304, for instance, by using the frontend translator 320 of FIG. 3. The translations can be bidirectional such that changes to the diagrams 310 are captured in object models 304 and may further result in changes to the code 308. The diagrams 310 can be constructed in a tiered format such that a project-level model has a high-level diagram 310 and upon drilling down to services within the project 402, lower-level diagrams 310 with associated object models 304 are accessed, for instance, at a service level, a class level, a method level, and the like. Although the example of FIGS. 4-6 depicts three instances of code 308, object models 304, and diagrams 310, there need not be a one-to-one correspondence, and any number of code 308 components can result in a different number of object models 304 and diagrams 310 depending on how a project, such as project 402, is constructed.

Figure 7:
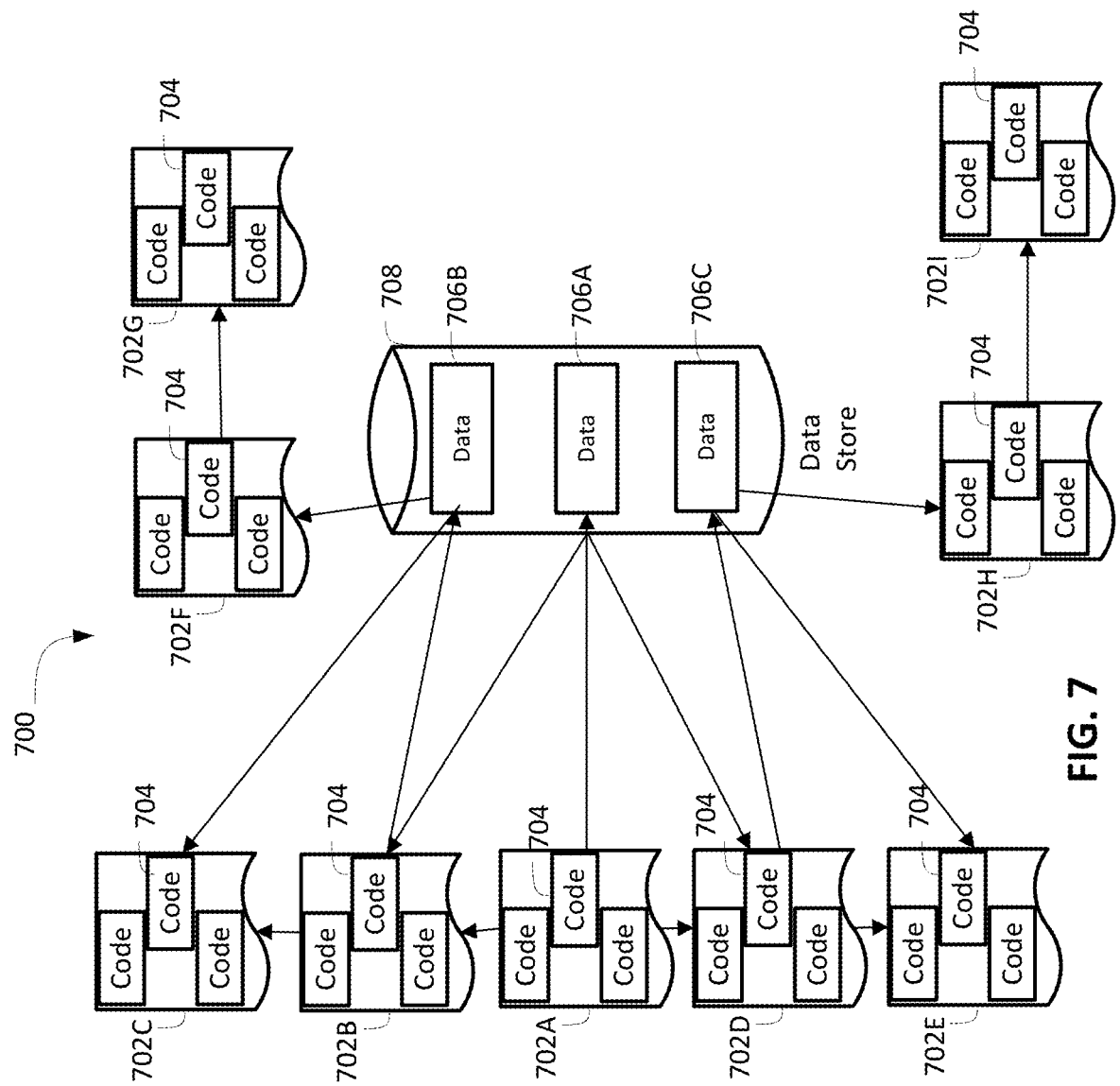
FIG. 7 depicts a block diagram of interactions between code and data according to some embodiments of the present invention.
Figure 8:
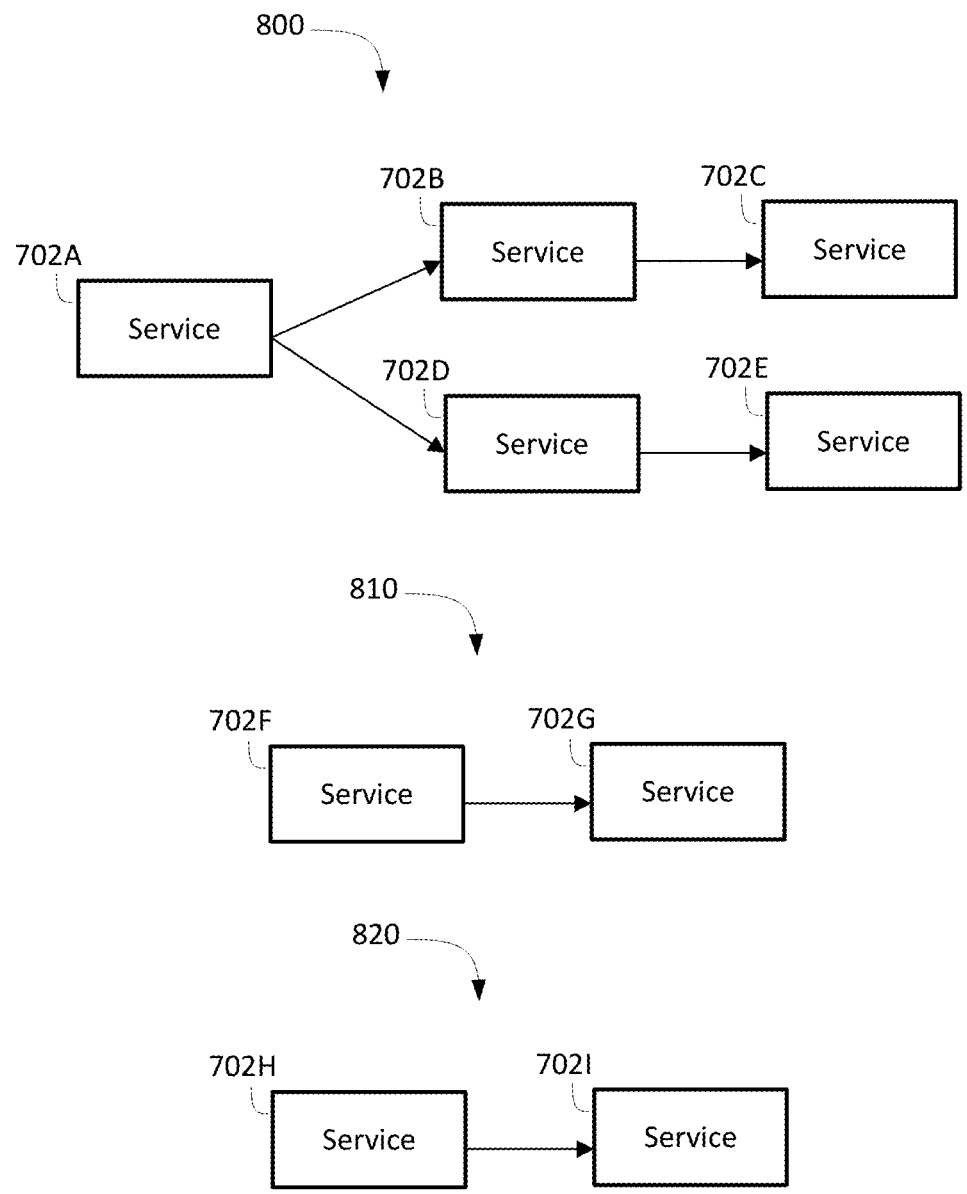
FIG. 8 depicts a block diagram of call trees of services according to some embodiments of the present invention.

FIG. 7 depicts a block diagram 700 of interactions between code and data according to some embodiments. In the example of FIG. 7, multiple services 702A, 702B, 702C, 702D, 702E, 702F, 702G, 702H, and 702I include code 704 that interacts directly or indirectly with data 706A, 706B, and 706C of data store 708. The data store 708 can be managed, for example, by data warehouse system 106 of FIG. 1. In the illustrated example, code 704 of service 702A can be a producer of data 706A, Service 702B is one consumer of data 706A and is a producer of data 706B based on data 706A. Service 702C is a consumer of data 706B and is called by service 702B, which is called by service 702A as depicted in call tree 800 of FIG. 8. Service 702D is another consumer of data 706A and is a producer of data 706C based on data 706A. Service 702E is a consumer of data 706C and is called by service 702D, which is called by service 702A as depicted in call tree 800 of FIG. 8. Service 702F is a consumer of data 706B and calls service 702G as depicted in call tree 810 of FIG. 8. Service 702H is a consumer of data 706C and calls service 702I as depicted in call tree 820 of FIG. 8. Thus, if a problem is detected with how service 702A formats or modifies data 706A, the impact may be direct with how services 702B and 702C generate and use data 706B and how services 702D and 702E generate and use data 706C. It may be more challenging to detect the potential indirect consequences on services 702F, 702G, 702H, and 702I, which are part of different call trees 810, 820 and do not directly access data 706A. By developing object models in a searchable format, such relationships may be identified that could otherwise go undetected. As a further example, if the code 704 used in services 702A-702E is written in a different programming language than the code in services 702F-702G and/or services 702H-702I, then finding such co-dependency relationships would be even less likely.

Figure 9:
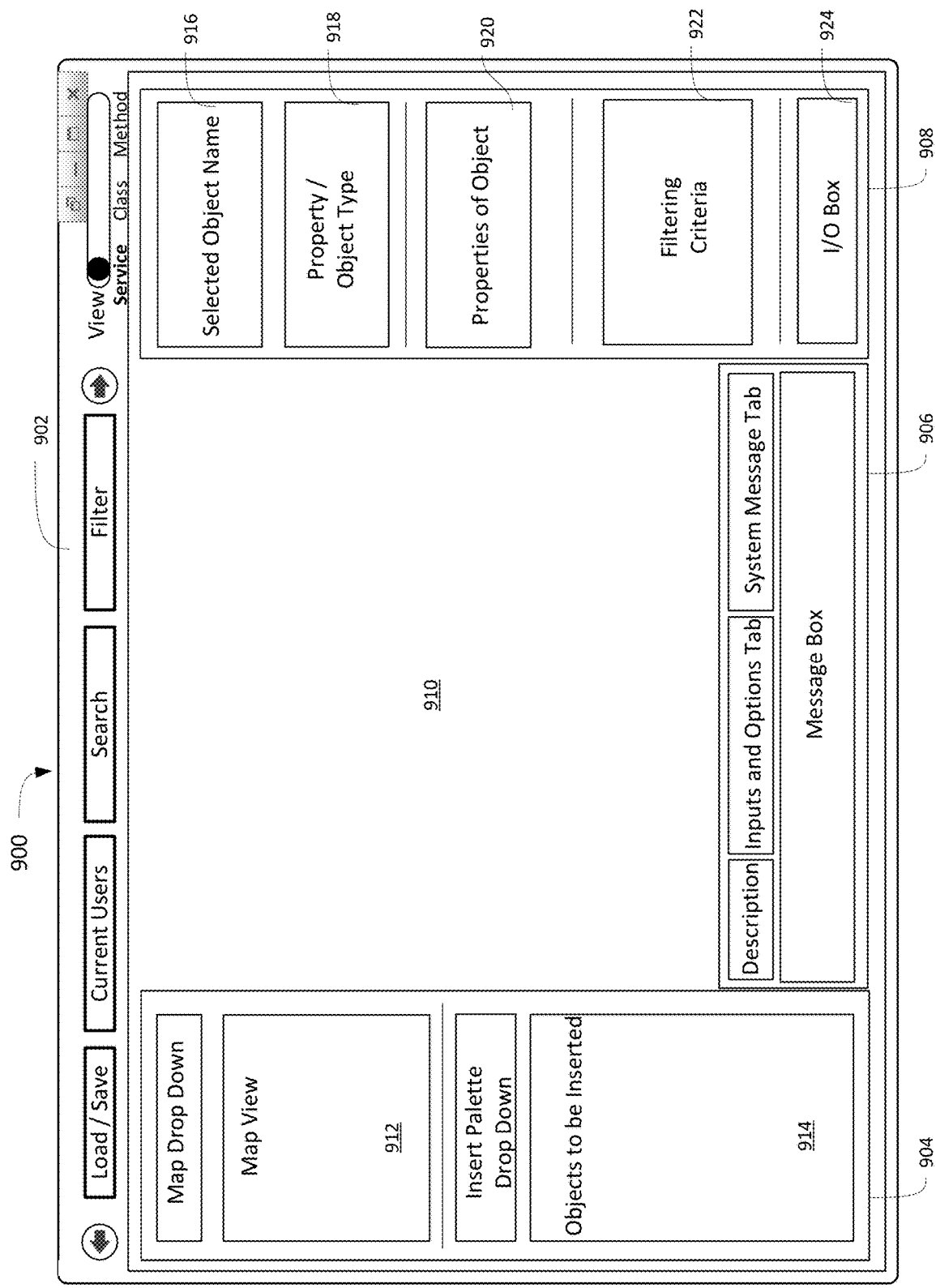
FIG. 9 depicts a user interface according to some embodiments of the present invention.

FIG. 9 depicts a user interface 900 according to some embodiments. The user interface 900 is an example of the user interface 302 of FIG. 3. In the example of FIG. 9, the user interface 900 includes a command bar 902, a view and insertion interface 904, a message and options interface 906, a selection and filtering interface 908, and a workspace 910. The command bar 902 can provide navigation control, file load/save control, user information, a search control, a filter control, and a view selector, for example. The view and insertion interface 904 can include a map view 912, which can comprise a reduced scale view of a diagram represented in the workspace 910 using a selected view type (e.g., service view, class view, method view). The view and insertion interface 904 can also include an object palette 914 to manually add objects to the workspace 910. The types of objects that may be selectable from the object palette 914 can include an object box, a condition, a controller, a service caller, a database, and other such constructs that appear graphically depicted when placed on the workspace 910 and have a predefined object template for translating the object into a portion of an object model. The message and options interface 906 can display descriptions, inputs and options, and/or system messages.

The selection and filtering interface 908 can be dynamically adjusted based on the current view type and objects selected in the workspace 910. As one example, the selection and filtering interface 908 can identify a selected object name 916, a property/object type 918, properties of the selected object 920, filtering criteria 922 to use with the filter control of the command bar 902, an input/output box 924, and other such interfaces. Changing the view type selected can update the workspace 910 and the layout/contents of the selection and filtering interface 908. The map view 912 can be updated with a change in the view type or may be separately controlled to allow a reduced view of a service in the map view 912, while viewing class level or method level interactions in the workspace 910. Although a specific layout of the user interface 900 is illustrated in the example of FIG. 9, it will be understood that many variations are contemplated and the user interface 900 is not to be construed as limiting.

Figure 10:
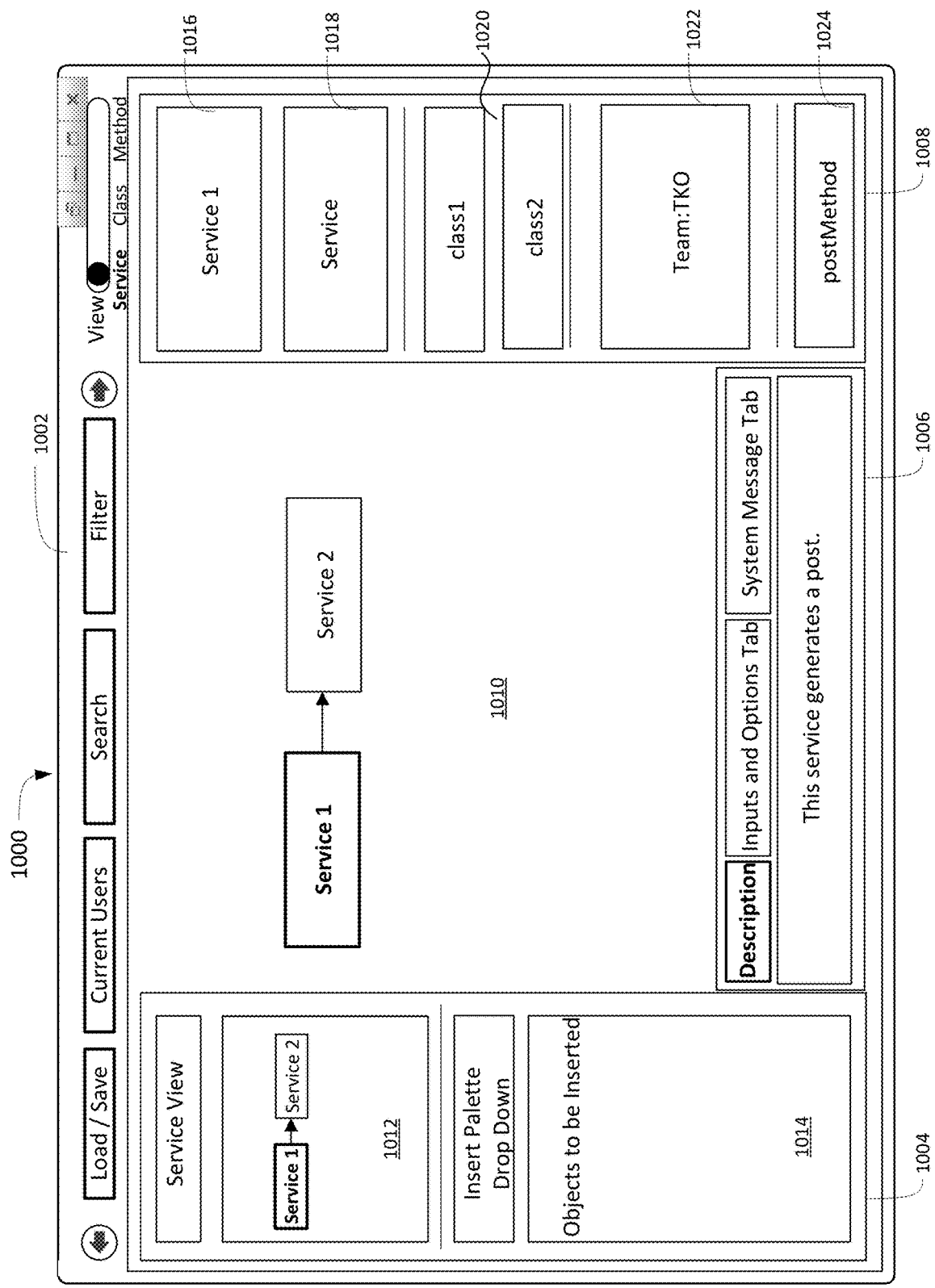
FIG. 10 depicts a user interface with a service view according to some embodiments of the present invention.

FIG. 10 depicts a user interface 1000 with a service view according to some embodiments. Similar to the example of FIG. 9, the user interface 1000 of FIG. 10 includes a command bar 1002, a view and insertion interface 1004, a message and options interface 1006, a selection and filtering interface 1008, and a workspace 1010. In the example of FIG. 10, the workspace 1010 illustrates a relationship of service1 calling service2, with service1 highlighted. The map view 1012 depicts a reduced scale illustration of the service view of workspace 1010. If additional objects were added to the workspace 1010, the map view 1012 would be updated correspondingly and can show a different scale to assist with navigating the view of the workspace 1010. Objects in the object palette 1014 can be selected as objects compatible with the project depicted in the workspace 1010. The message and options interface 1006 illustrates a description associated with service1 as highlighted. The selection and filtering interface 1008 illustrates that service1 is the selected object name 1016 with a property/object type 1018 of service. Service1 can include properties 1020 including class1 and class2. Filter criteria 1022 indicates that the filter command was set to target a project of a specific development team. Input/output box 1024 indicates that I/O of service1 includes a posting method (postMethod).

The diagram as depicted on workspace 1010 can be automatically generated from an object model associated with the project. If a user modifies the diagram, the changes can be translated back to the associated object model. For instance, moving the diagram components within the workspace 1010 can result in an update to the associated object model such that the visual updates are captured and can be recreated even if the substance of the project has not changed.

Figure 11:
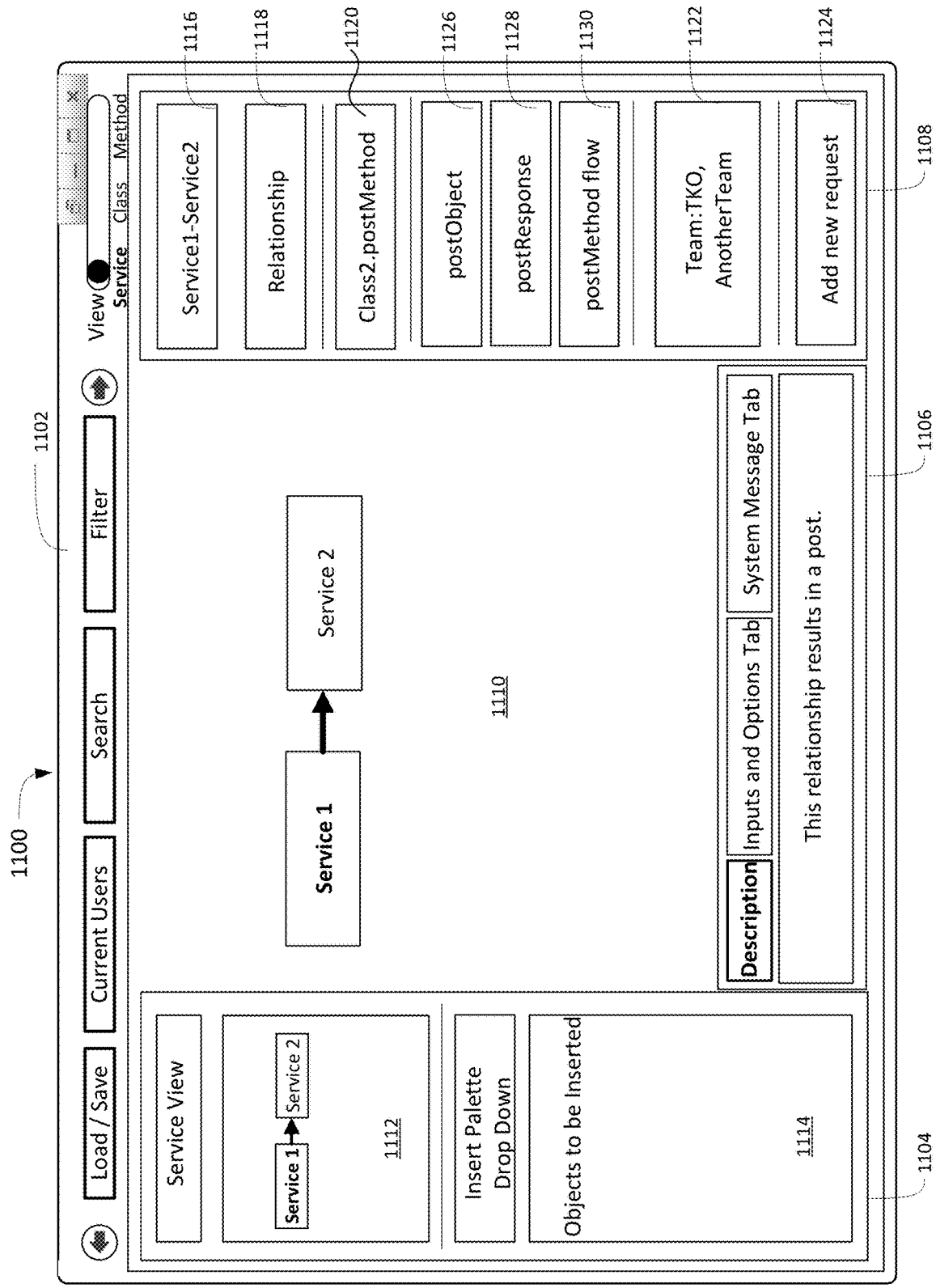
FIG. 11 depicts a user interface with a service view highlighting a relationship according to some embodiments of the present invention.

FIG. 11 depicts a user interface 1100 with a service view highlighting a relationship according to some embodiments. Similar to the example of FIG. 10, the user interface 1100 of FIG. 11 includes a command bar 1102, a view and insertion interface 1104, a message and options interface 1106, a selection and filtering interface 1108, and a workspace 1110. In the example of FIG. 11, the workspace 1110 illustrates a relationship of service1 calling service2, with the relationship between service1 and service2 highlighted. The map view 1112 depicts a reduced scale illustration of the service view of workspace 1110. Objects in the object palette 1114 can be selected as objects compatible with the project depicted in the workspace 1110. The message and options interface 1106 illustrates a description associated with the relationship as highlighted. The selection and filtering interface 1108 illustrates that the service1-service2 relationship is the selected object name 1116 with a property/object type 1118 of relationship. The relationship can include properties 1120 including a class2.postMethod. The contents of the class2.postMethod can be further illustrated in the selection and filtering interface 1108 as including a postObject 1126, a postResponse 1128, and a postMethod flow 1130. Filter criteria 1122 indicates that the filter command was set to target a project of two specific development teams. Input/output box 1124 indicates that a new request can be added as an I/O of the relationship.

Figure 12:
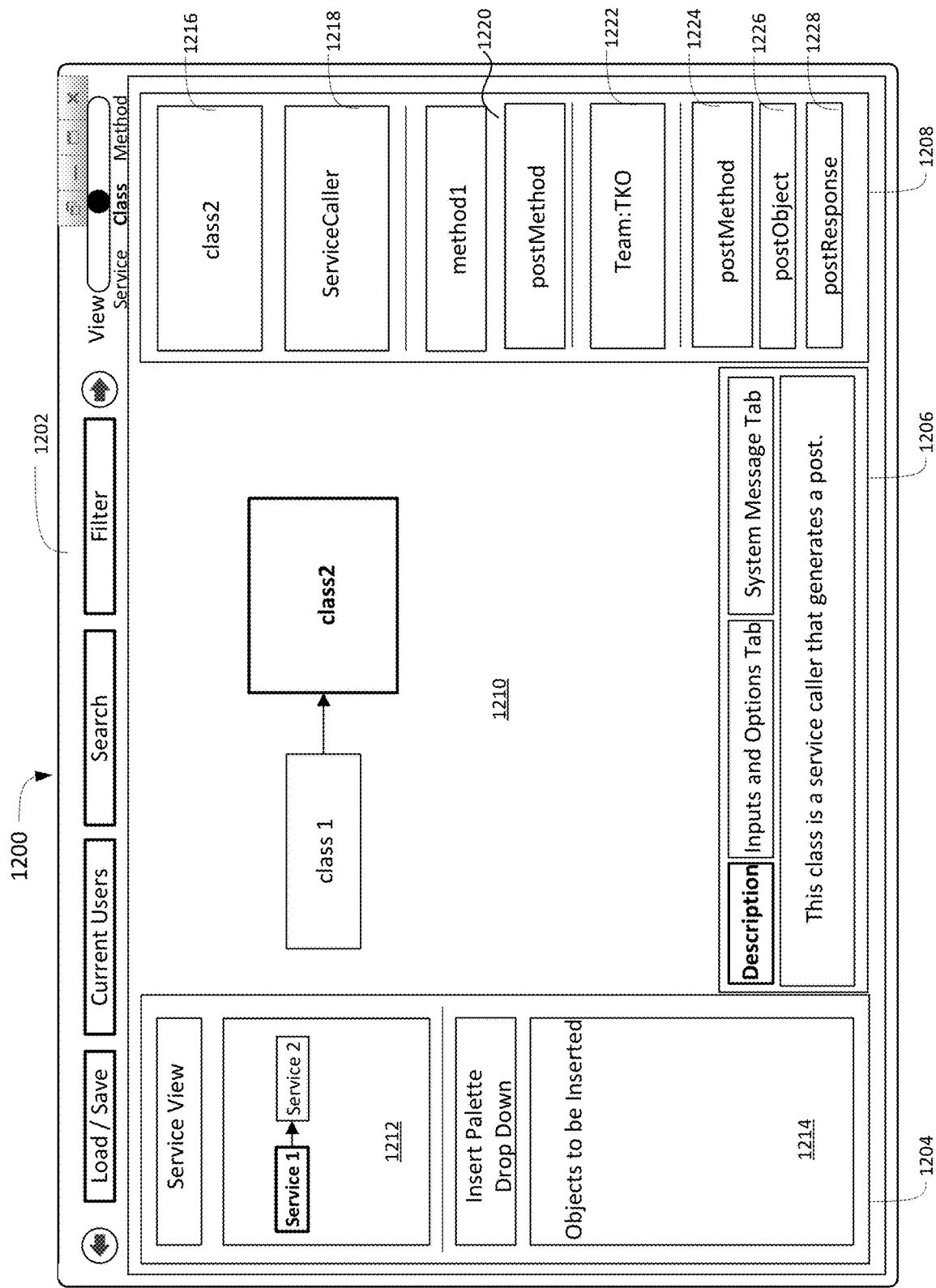
FIG. 12 depicts a user interface with a class view according to some embodiments of the present invention.

FIG. 12 depicts a user interface 1200 with a class view according to some embodiments. Similar to the example of FIG. 10, the user interface 1200 of FIG. 12 includes a command bar 1202, a view and insertion interface 1204, a message and options interface 1206, a selection and filtering interface 1208, and a workspace 1210. In the example of FIG. 12, the workspace 1210 illustrates a relationship of class1 calling class2, with class2 highlighted in a class view. The map view 1212 depicts a reduced scale illustration of the service view of workspace 1210. In map view 1212, service1 is highlighted. Using the class view of the workspace 1210, the class contents of service1 are depicted as a lower-level drawing. Objects in the object palette 1214 can be selected as objects compatible with the project depicted in the workspace 1210 as a class view level. The message and options interface 1206 illustrates a description associated with class2 as highlighted. The selection and filtering interface 1208 illustrates that class2 is the selected object name 1216 with a property/object type 1218 of Service-Caller. Class2 can include properties 1220 including method1 and postMethod. Filter criteria 1222 indicates that the filter command was set to target a project of a specific development team. An input/output box indicates that I/O of class2 includes postMethod 1224, postObject 1226, and postResponse 1228. If the view selector for the workspace 1210 is changed to a method view, then the further details of method1 and postMethod would be depicted with the message and options interface 1206 and selection and filtering interface 1208 updated accordingly.

Figure 13:
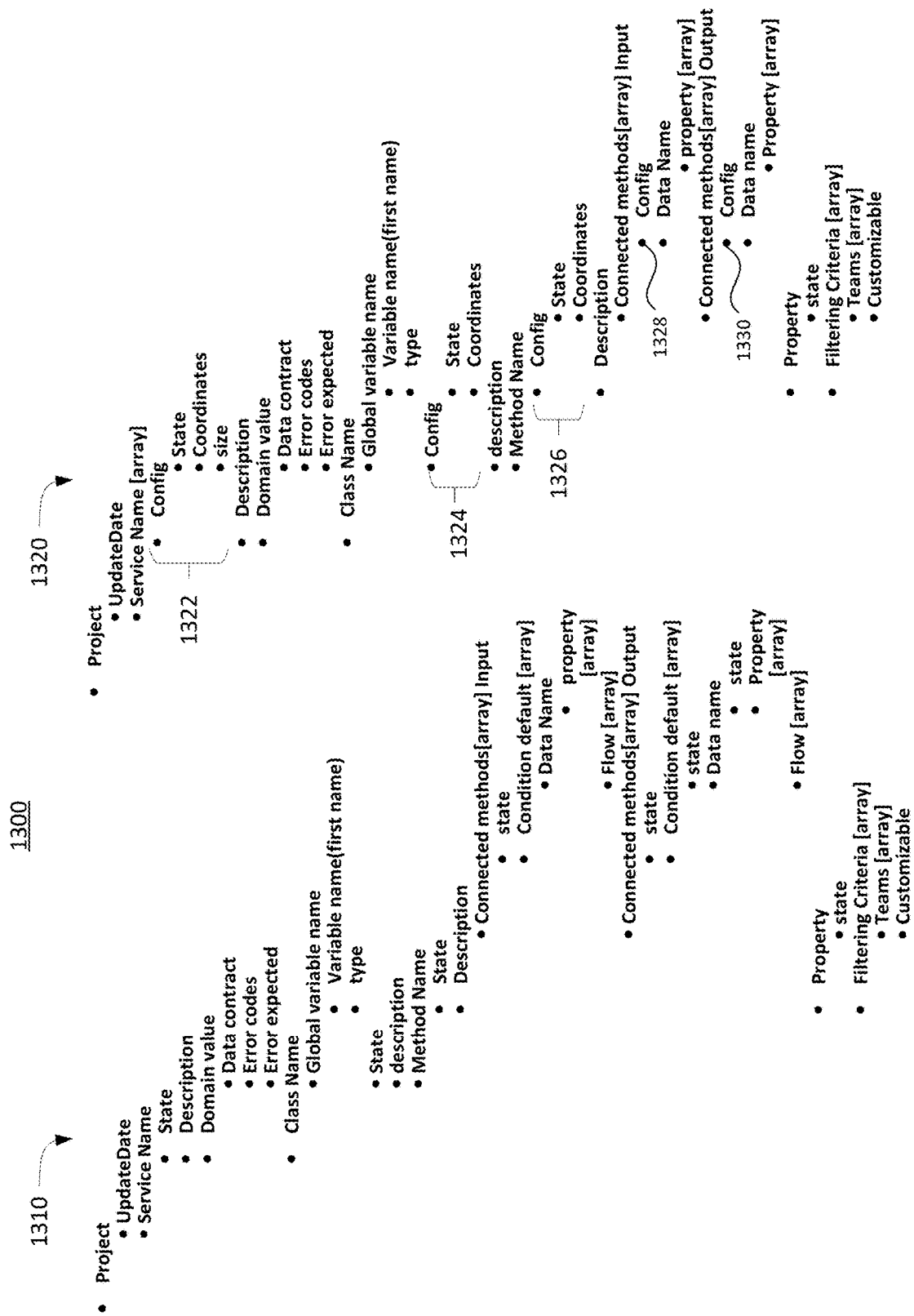
FIG. 13 depicts an object model template adjustment according to some embodiments of the present invention.

FIG. 13 depicts an object model template adjustment 1300 according to some embodiments. In parsing a project definition and associated code, such as project definitions 312 and code 308 of FIG. 3, the analysis tool 118 of FIG. 1 can generate object models 304 based on one or more object model templates. Object model template 1310 illustrates the type of information that the analysis tool 118 may initially seek to populate at a project level, such as an update date, a service name, and domain values. The domain values can include interface and error definitions, such as a data contract defining data output rules and error codes with expected errors that define the types of errors or problems that may result during execution. At a lower level through the code, a class name, variables, states, description, and methods can be sought, along with assigning filtering criteria with customizable fields. An object model, such as one of the object models 304, can be initially populated as the code translator 318 of the translator service 316 extracts the information from the code 308. The analysis tool 118 can further update the object model template 1310 as object model template 1320 by adding additional configuration placeholders 1322, 1324, 1326, 1328, and 1330 to support translation of the object model by the frontend translator 320 into a diagram 310 that can be displayed through the user interface 302. For example, the configuration placeholders 1322-1330 can define state, placement coordinates, and sizing for representative objects at various levels, such as a service level, a class level, a method level, and a data level. As the resulting diagram 310 is manipulated through the user interface 302, any changes in placement and sizing information can be captured and flowed back as an update in the configuration information of the object model. As a project is expanded, multiple object models can be linked together or merged into a larger scale object model.

Figure 14:
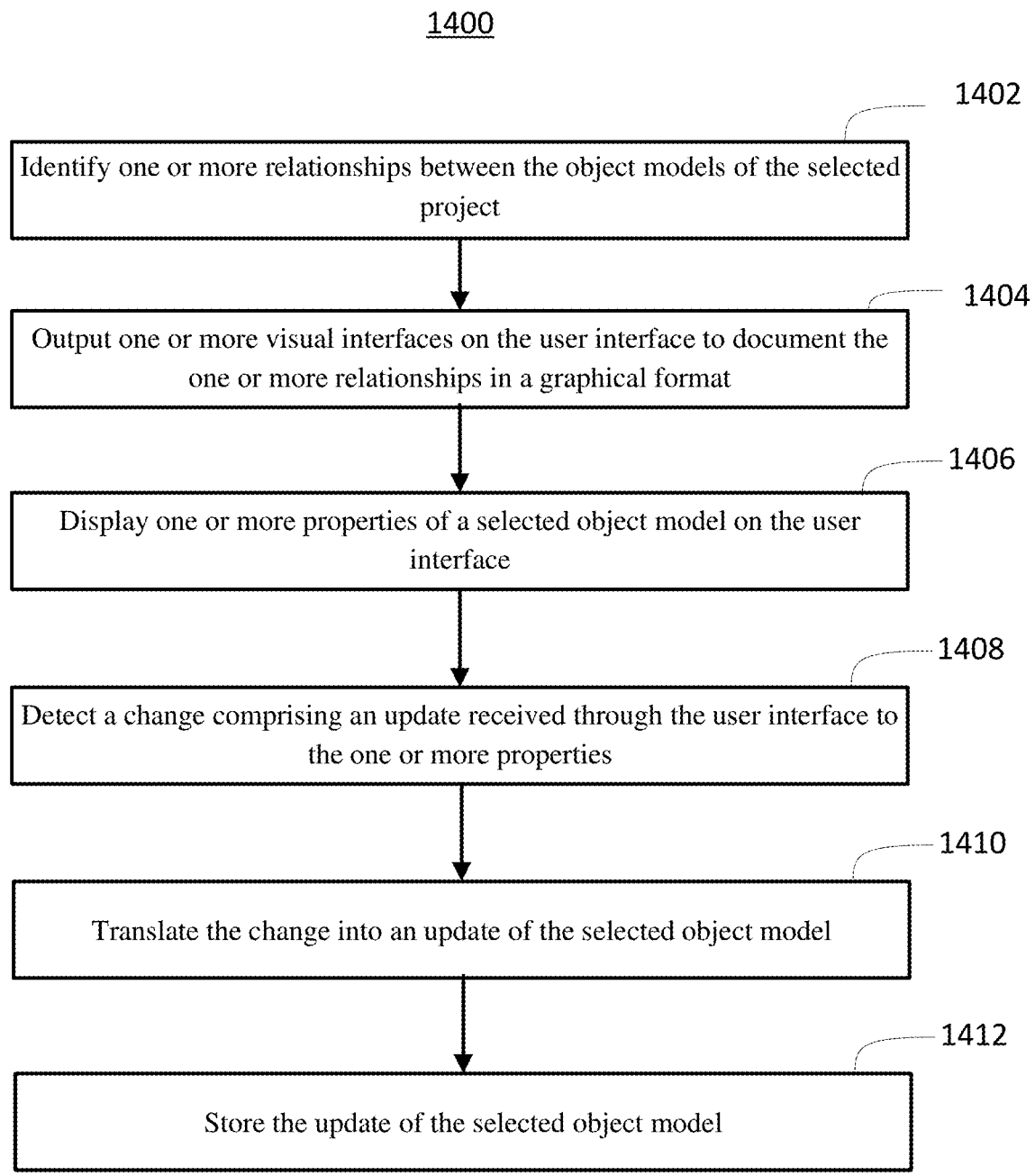
FIG. 14 depicts a process flow according to some embodiments of the present invention.

Turning now to FIG. 14, a process flow 1400 is depicted according to an embodiment. The process flow 1400 includes a number of steps that may be performed in the depicted sequence or in an alternate sequence. The process flow 1400 may be performed by the system 100 of FIG. 1. The process flow 1400 is described in reference to FIGS. 1-14 and can be performed by the analysis tool 118 and/or other components of the system 100. A user interface 302 can be configured to interpret a plurality of object models 304 and display the object models 304 in a graphical format. A database service 314 can be configured to access a database 306 that identifies code 308 associated with one or more projects. The database 306 can be configured to identify a plurality of versions of the code 308, and the database service 314 can be configured to select one or more versions of the code 308. The code 308 can include one or more programming language files partitioned into one or more classes, where each of the one or more classes can include one or more methods. A translator service 316 can be configured to parse the code 308 and generate object models 304 associated with a selected project of one or more projects. The one or more projects can be tagged with a project version that is associated with a combination of the one or more versions of the code 308. The user interface 302 can be configured to display a state of one or more services documented in the selected project.

At block 1402, analysis tool 118 can identify one or more relationships between object models 304 of a selected project. At block 1404, the analysis tool 118 can output one or more visual interfaces on a user interface 302 to document the one or more relationships in a graphical format. For example, objects of a project can be depicted as a diagram 310 including relationships defined between the objects. The user interface 302 can be configured to provide a service view to document a plurality of services that form the selected project and a class view to document a selected service at a class level and a method level.

At block 1406, the analysis tool 118 can display one or more properties of a selected object model on the user interface 302. The object models 304, the one or more relationships, and the one or more properties can be stored in a text-based object notation file format, such as a Java Script Object Notation (JSON) format.

At block 1408, the analysis tool 118 can detect a change including an update received through the user interface 302 to the one or more properties. At block 1410, the analysis tool 118 can translate the change into an update of the selected object model. At block 1412, the analysis tool 118 can store the update of the selected object model.

In some embodiments the user interface 302 can include a search interface (e.g., a search control of a command bar) configured to initiate a search across the one or more projects. The search interface can be configured to search for error codes and identify one or more portions of the code 308 associated with the error codes. Further, the search interface can be configured to search for data shared by multiple portions of the code 308. The search interface can be configured to search for one or more service callers of a service. The user interface 302 can also include a filter interface (e.g., selection and filtering interface 908) configured to filter one or more criteria for display on the user interface 302. Further, the user interface 302 can illustrate a call tree between the object models 304 associated with an error condition. For instance, call trees 800, 810, 820 can be displayed on the user interface 302.

In some embodiments, the analysis tool 118 can access a problem reporting tool 334 to locate one or more problem reports 332. The analysis tool 118 can search the one or more projects for at least one issue identified in the one or more problem reports 332. A notification can be output based on finding the at least one issue, such as an on screen notification through user interface 302 or other such notification/alert.

In some embodiments, the analysis tool 118 can interface with a code repository management tool 324 and generate an update to at least one of the object models 304 associated with updated code based on the code repository management tool 324 detecting a check-in event for the updated code. Other events can also trigger update actions, such as events received through the auto translator 322.

In some embodiments, the analysis tool 118 can check a user profile 346 of a user accessing the user interface 302. The analysis tool 118 can limit access of the user to the code 308 based on one or more permissions of the user as identified in the user profile 346. The analysis tool 118 can limit a change capability of the one or more relationships and the one or more properties based on the one or more permissions of the user as identified in the user profile 346.

Figure 15:
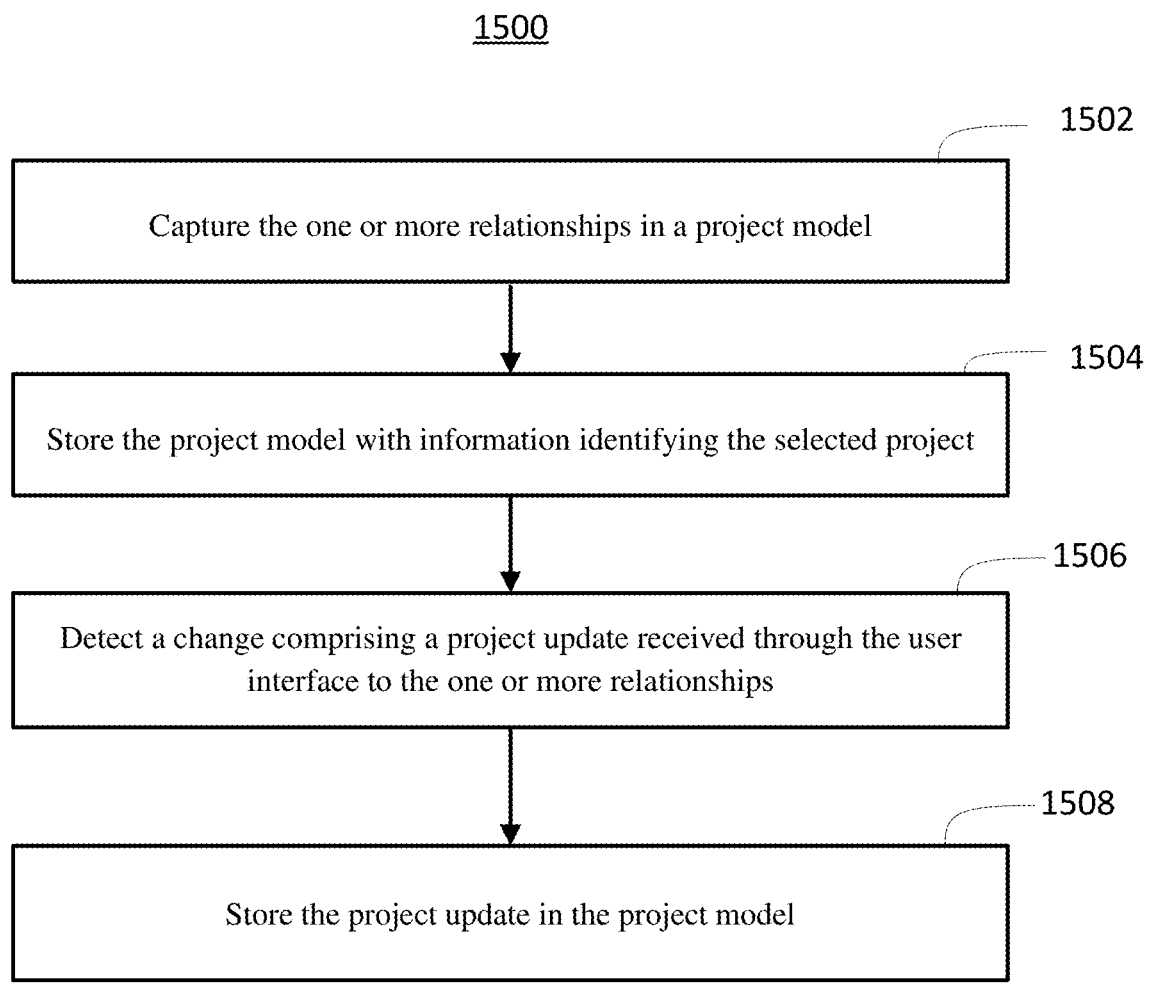
FIG. 15 depicts a process flow according to some embodiments of the present invention.

Turning now to FIG. 15, a process flow 1400 is depicted according to an embodiment. The process flow 1500 includes a number of steps that may be performed in the depicted sequence or in an alternate sequence. The process flow 1500 may be performed by the system 100 of FIG. 1. The process flow 1500 can expand upon the process flow 1400 of FIG. 14. The process flow 1500 is described in reference to FIGS. 1-15.

At block 1502, the analysis tool 118 can capture one or more relationships in a project model that is a higher-level object model 304. At block 1504, the analysis tool 118 can store the project model with information identifying the selected project. At block 1506, the analysis tool 118 can detect a change that includes a project update received through the user interface 302 to one or more relationships. At block 1508, the analysis tool 118 can store the project update in the project model. The project model can comprise a type of object model 304 that includes fields associated with project definitions 312. For example, object model template 1320 can generate a project model as a type of object model that links lower level aspects of code 308.

Technical effects include documenting and displaying a visualization of the contents of a software project that includes one or more sources of code. Object models can be linked into project models, which are higher-level object models that illustrate how objects are linked. Using object models to document and visualize code can result in an ability to understand the architecture of complex applications, assist in developing new applications, and identify problems that may impact applications prior to the problems being identified by a user.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded on to a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s)

are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G, 4G, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a user interface configured to interpret a plurality of object models and display the object models in a graphical format;
   a database service configured to access a database that identifies code associated with one or more projects;
   a translator service configured to detect a file ty e of ode and invoke a code translator to parse the code and generate object models associated with a selected project of the one or more projects by converting the code into the object models based on detecting the file type of the code, wherein portions of the code interact to form the one or more projects as executable code to execute on one or more code execution servers; and
   an analysis tool executable by at least one processing device and comprising a plurality of instructions that when executed by the at least one processing device result in:
      identifying one or more relationships between the object models of the selected project;
      outputting one or more visual interfaces on the user interface to document the one or more relationships in a graphical format;
      displaying one or more properties of a selected object model on the user interface;
      detecting a change comprising an update received through the user interface to the one or more properties;
      translating the change into an update of the selected object model; and
      storing the update of the selected object model.

2. The system of claim 1, further comprising instructions that when executed by the at least one processing device result in:
   capturing the one or more relationships in a project model; and
   storing the project model with information identifying the selected project.

3. The system of claim 2, further comprising instructions that when executed by the at least one processing device result in:
   detecting a change comprising a project update received through the user interface to the one or more relationships; and
   storing the project update in the project model.

4. The system of claim 1, wherein the code comprises one or more programming language files partitioned into one or more classes, each of the one or more classes comprising one or more methods.

5. The system of claim 4, wherein the user interface is configured to provide a service view to document a plurality of services that form the selected project and a class view to document a selected service at a class level and a method level.

6. The system of claim 1, wherein the user interface comprises a search interface configured to initiate a search across the one or more projects.

7. The system of claim 6, wherein the search interface is configured to search for error codes and identify one or more portions of the code associated with the error codes.

8. The system of claim 6, wherein the search interface is configured to search for data shared by multiple portions of the code.

9. The system of claim 6, wherein the search interface is configured to search for one or more service callers of a service.

10. The system of claim 1, wherein the user interface comprises a filter interface configured to filter one or more criteria for display on the user interface.

11. The system of claim 1, further comprising instructions that when executed by the at least one processing device result in:
    illustrating a call tree between the object models associated with an error condition.

12. The system of claim 1, wherein the database is configured to identify a plurality of versions of the code and the database service is configured to select one or more versions of the code.

13. The system of claim 12, wherein the one or more projects are tagged with a project version that is associated with a combination of the one or more versions of the code.

14. The system of claim 1, wherein the user interface is configured to display a state of one or more services documented in the selected project.

15. The system of claim 1, further comprising instructions that when executed by the at least one processing device result in:
    accessing a problem reporting tool to locate one or more problem reports;
    searching the one or more projects for at least one issue identified in the one or more problem reports; and
    outputting a notification based on finding the at least one issue.

16. The system of claim 1, further comprising instructions that when executed by the at least one processing device result in:
    interfacing with a code repository management tool; and
    generating an update to at least one of the object models associated with updated code based on the code repository management tool detecting a check-in event for the updated code.

17. The system of claim 1, further comprising instructions that when executed by the at least one processing device result in:
    checking a user profile of a user accessing the user interface; and
    limiting access of the user to the code based on one or more permissions of the user as identified in the user profile.

18. The system of claim 17, further comprising instructions that when executed by the at least one processing device result in:
    limiting a change capability of the one or more relationships and the one or more properties based on the one or more permissions of the user as identified in the user profile.

19. The system of claim 1, wherein the object models, the one or more relationships, and the one or more properties are stored in a text-based object notation file format.

20. A computer program product comprising a non-transitory computer-readable storage medium embodied with computer program instructions that when executed by a computer cause the computer to implement:
- identifying one or more relationships between object models of a selected project of one or more projects, wherein a translator service detects a file type of code and invokes a code translator to parse the code and generates the object models associated with the selected project of the one or more projects by converting code into the object models based on detecting the file type of the code, and portions of the code interact to form the one or more projects as executable code to execute on one or more code execution servers;
- outputting one or more visual interfaces on a user interface to document the one or more relationships in a graphical format;
- displaying one or more properties of a selected object model on the user interface;
- detecting a change comprising an update received through the user interface to the one or more properties;
- translating the change into an update of the selected object model; and
- storing the update of the selected object model.

21. The computer program product of claim 20, further comprising computer program instructions that when executed by the computer cause the computer to implement:
- capturing the one or more relationships in a project model;
- storing the project model with information identifying the selected project;
- detecting a change comprising a project update received through the user interface to the one or more relationships; and
- storing the project update in the project model.

22. The computer program product of claim 20, wherein the code comprises one or more programming language files partitioned into one or more classes, each of the one or more classes comprising one or more methods, and wherein the user interface is configured to provide a service view to document a plurality of services that form the selected project and a class view to document a selected service at a class level and a method level.

23. The computer program product of claim 20, wherein the user interface comprises a search interface configured to initiate a search across the one or more projects, and the search interface is configured to:
- search for one or more of:
  - error codes and identify one or more portions of the code associated with the error codes;
  - data shared by multiple portions of the code; and
  - one or more service callers of a service; and
- output one or more results of the search on the user interface.

24. The computer program product of claim 20, further comprising computer program instructions that when executed by the computer cause the computer to implement:
- accessing a problem reporting tool to locate one or more problem reports;
- searching the one or more projects for at least one issue identified in the one or more problem reports; and
- outputting a notification based on finding the at least one issue.

25. The computer program product of claim 20, further comprising computer program instructions that when executed by the computer cause the computer to implement:
- interfacing with a code repository management tool; and
- generating an update to at least one of the object models associated with updated code based on the code repository management tool detecting a check-in event for the updated code.

* * * * *